United States Patent Office 2,784,471
Patented Mar. 12, 1957

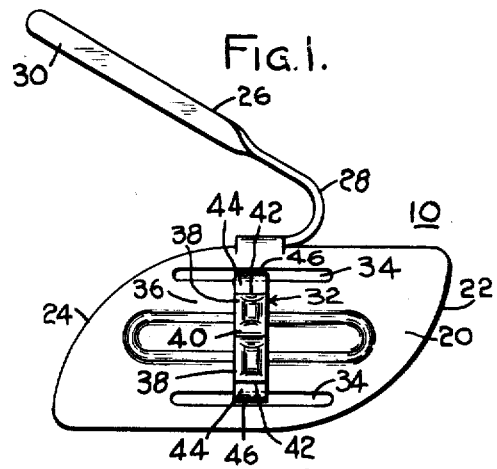
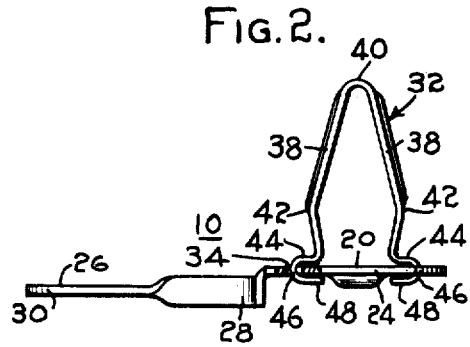
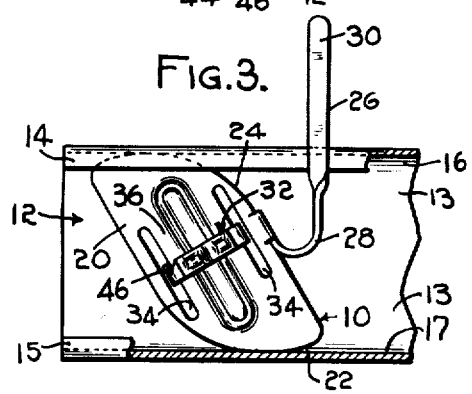
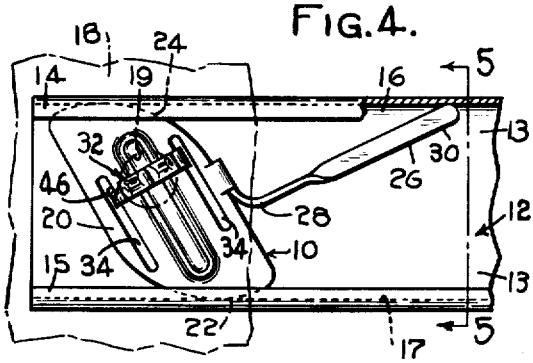
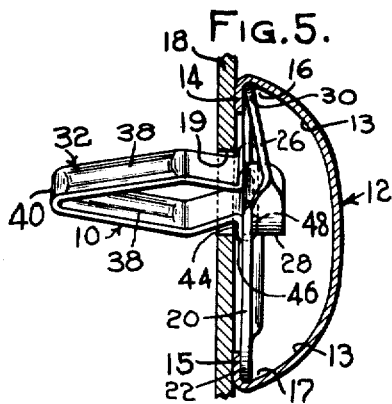
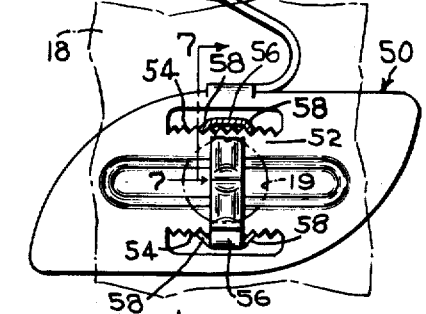
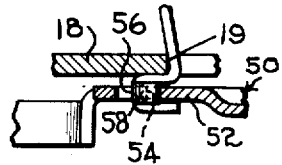
INVENTOR:
WILLIAM A. BEDFORD JR
BY Robert E Ross
ATTORNEY.

2,784,471

FASTENING DEVICE

William A. Bedford, Jr., North Scituate, Mass., assignor, by mesne assignments, to United-Carr Fastener Corporation, Boston, Mass., a corporation of Delaware Application August 22, 1952, Serial No. 305,812

3 Claims. (Cl. 24—73)

This application is a continuation-in-part of my application Serial No. 197,052, filed November 22, 1950.

This invention relates generally to fastening devices, and has particular reference to a fastener for retaining a channeled molding onto a panel.

The object of the invention is to provide a fastener which is adapted for rotation into engagement with opposite edge portions of a channeled molding, in which snap fastener means is provided for snapping engagement into a panel opening.

A further object of the invention is to provide a fastener having means adapted for engagement with moldings of various sizes in which snap fastener means provided thereon for snapping engagement into a panel opening is laterally adjustable in relation to said means.

A still further object of the invention is to provide a molding fastener adapted for assembly into moldings of various sizes, in which a molding-engaging portion which is adapted for rotation into engagement between opposite edges of a molding is provided with panel-engaging snap fastener means disposed thereon which is adjustable on the cross plate to compensate for the position of the cross plate in the molding.

Another object of the invention is to provide a molding fastener having means thereon for snapping engagement with a supporting panel, in which said means is adjustable laterally prior to engagement with the panel, and is relatively fixed and immovable after engagement with the panel.

Other objects of the invention will, in part, be obvious, and will, in part, appear hereinafter.

In the drawing:

Fig. 1 is a top plan view of a molding fastener embodying the features of the invention;

Fig. 2 is a view in elevation of the fastener of Fig. 1;

Fig. 3 is a view in elevation illustrating the method of assembly of the fastener into a channeled molding;

Fig. 4 is a view similar to Fig. 3 in which the fastener is completely assembled into the molding;

Fig. 5 is a view in section taken on line 5—5 of Fig. 4;

Fig. 6 is a top plan view of a fastener having certain modifications within the scope of the invention; and Fig. 7 is a view in section taken on line 7—7 of Fig. 6.

Referring to the drawing, there is illustrated a molding fastener 10, which is adapted for assembly into a molding 12 having an outwardly rounded body portion 13 with inturned edges 14 and 15 forming opposing recesses 16 and 17, and is adapted for attachment to a supporting panel 18 through an opening 19 disposed therein.

The fastener 10 comprises generally a cross plate 20 formed of rigid material such as high carbon steel which is elongated and has diagonally opposite rounded end portions to provide smooth rounded bearing surfaces 22 and 24 to enable the cross plate to be rotated into position in moldings of various widths as will appear hereinafter.

To provide means for urging the cross plate into the proper position, a flat spring arm 26 is disposed on the medial portion of one side thereof, which is joined to the plate at one end and extends alongside the plate to a reverse bend portion 28 and then extends outwardly in inclined relation to the adjacent edge of the plate to terminate in a free end portion 30. If the fastener is to be assembled into moldings which have extremely narrow recesses, the free end portion 30 may be rotated so as to be substantially parallel to the plane of the cross plate to enable it to seat in the recesses. This feature is disclosed in applicant's co-pending application Serial No. 270,860, filed February 9, 1952, and assigned to the same assignee as the present application.

To provide means for attaching the fastener to the supporting panel 18, a snap fastener member 32 is assembled onto the cross plate, and to permit such assembly, a pair of spaced slots 34 are provided in the cross plate and extend longitudinally thereon forming a center portion 36 which may be longitudinally embossed to impart rigidity thereto. The snap fastener 32 is formed of a strip of sheet metal bent at the medial portion to form a pair of legs 38 joined at a pilot nose 40 and having outwardly extending snap shoulders 42 spaced from the plane of the base. The ends of the legs are provided with laterally extending feet 44 seated on the cross plate, which extend to a reverse bend portion 46 disposed in the slots 34, and terminate in a retaining end portion 48 disposed on the side of the plate opposite the feet 44. The snap fastener member 32 is normally freely movable in the slots longitudinally of the cross plate, to permit the snap fastener to adjust itself to the position of the opening 19 in the supporting panel, as will be described more fully hereinafter.

To assemble the fastener into the molding, the cross plate is placed between the edges 14 and 15 and rotated until the bearing surfaces 22 and 24 enter the opposing recesses 16 and 17 (see Fig. 3). The spring arm 26 may then be sprung outwardly laterally away from the plate until it can pass under the inturned edge portion 14 and seat in the recess 16, where it is retained under tension to rotatably urge the cross plate against the opposing edges of the molding (see Fig. 4).

After a suitable number of fasteners have been assembled into a strip of molding, the assembly may then be secured to the supporting panel 18 by aligning the snap fastener member 32 with an appropriate opening in the panel and snapping it therethrough so that the molding is securely retained on the panel (see Figs. 4 and 5). The diameter of the openings in the panel and the size of the snap fastener member are in such relation to each other that when the member is snapped into the opening, the ends of the legs of the fastener are drawn together to tightly engage the opposite edges of the center portion 36 thereafter, the fastener is relatively immovable in relation to the cross plate.

During the snapping of the fastener into the panel openings, which is ordinarily accomplished by pushing on the molding, the rounded bearing surfaces of the cross plate tend to be pushed away from the inturned edges 14 and 15 to bear against the rounded body portion 13. Hence the cross plate tends to be rotated on the rounded portion into a position parallel to the longitudinal axis of the molding; however, the spring arm 26, which rotatably urges the cross plate in the opposite direction, retains the cross plate in the proper rotational position in the molding.

The panel 18 may be a relatively large sheet metal structure, such as the body or fender of an automobile. Since it is extremely difficult to pre-locate holes accurately in panels of such size, the holes provided for receiving the snap fastener members may be slightly out of alignment, or the entire series of holes may be slightly misplaced from the desired position. In either case, the adjustability of the snap fastener member 32 on the cross plate enables the fastener to compensate for such inaccuracies in the hole positions to allow the molding to be assembled into the proper position thereon.

The fastener is particularly adapted for use in moldings that taper in width throughout the length thereof, since the cross plate can rotate to accommodate such variations in width. When such tapered molding is to be assembled onto an automobile body or fender, in many cases the series of openings formed therein to receive the fastening means are so positioned as to be parallel to one edge of the molding, rather than disposed on the center line of the molding. Hence the provision of the adjustable snap fastener member permits the molding to be assembled into the proper position on such a panel, with an edge of the molding disposed parallel to the center line of the series of openings.

Referring now to Figs. 6 and 7, there is illustrated a molding fastener 50 which has certain modifications within the scope of the invention.

The fastener 50 is substantially identical with the fastener 10, with the exception that the center portion 52, which corresponds to the center portion 56 of the fastener 10, is provided with serrated edges 54, and the reverse bend portions 56 of the legs of the snap fastener, which correspond to the reverse bend portions 46 of the fastener 10, are each provided with detent means 58 for interlocking engagement with the serrated edges. The legs are normally so spaced that the detent means 58 is not in engagement with the serrated edges so that the snap fastener is freely movable along the center portion 52 before the snap fastener is snapped into the panel opening. However, as described hereinbefore, the size of the opening is such that after engagement of the snap fastener therein, the legs are forced together so that the detent means 58 engage the serrated edges 54 and provide a positive lock to prevent movement of the molding relative to the panel.

Since certain other obvious changes may be made in the device without departing from the scope of the invention, it is intended that all matter contained herein be interpreted in an illustrative and not a limiting sense.

I claim:

1. A molding fastener for assembly between opposite edge portions of a channel molding comprising a cross plate for spanning the distance between the edge portions, said cross plate having diagonally opposite rounded end portions whereby said cross plate may be rotated into position in said molding with said rounded end portions engaging the opposite edges, a resilient spring arm secured to one side edge of the plate for engagement with a portion of the molding to rotatably urge the cross plate into said edge engaging position, said cross plate having a pair of spaced, parallel, elongated slots extending longitudinally therethrough in the direction of the rounded end portions, and a resilient, substantially V-shaped snap fastener member assembled onto the plate and protruding from the plane thereof, said snap fastener member having spaced leg members with U-shaped end portions thereof disposed in said spaced slots and extending toward one another on both faces of said cross plate for substantially equal distances, said snap fastener member end portions being normally freely movable longitudinally in said slots, said leg members being movable toward one another when said snap fastener member is snapped into a panel opening to cause said end portions of the legs to grip the side walls of the slots in the cross plate to prevent movement thereafter of said snap fastener member longitudinally of said cross plate.

2. A molding fastener as set forth in claim 1 in which said cross plate is provided with a longitudinal embossed portion extending between said slots, said embossed portion having a height greater than the thickness of said end portions.

3. A molding fastener for assembly between opposite edge portions of a channel molding comprising a cross plate for spanning the distance between the edge portions, said cross plate having diagonally opposite rounded end portions whereby said cross plate may be rotated into position in said molding with said rounded end portions engaging the opposite edges, a resilient spring arm secured to one side edge of the plate for engagement with the portion of the molding to rotatably urge the cross plate into said edge engaging position, said cross plate having a pair of spaced parallel slots extending longitudinally therein in the direction of the rounded end portions, and a resilient snap fastener member assembled onto the plate and protruding from the plane thereof, said snap fastener member comprising a strip of sheet metal bent at the medial portion to form a V-shaped body having a pair of shouldered legs for snapping into a panel opening, said legs having U-shaped foot portions disposed at substantially right angles to the long axis thereof and disposed in said spaced slots and extending toward one another on both faces of said cross plate for substantially equal distances, said foot portions being normally freely movable longitudinally in said slots, said leg members being movable toward one another when said snap fastener member is snapped into a panel opening to cause said foot portions of said legs to grip the side walls of the slots in the cross plate to prevent movement thereafter of said snap fastener member longitudinally of said cross plate.

References Cited in the file of this patent

UNITED STATES PATENTS

| | | |
|---|---|---|
| 1,195,811 | Gustavsen | Aug. 22, 1916 |
| 2,515,895 | Poupitch | July 18, 1950 |
| 2,540,396 | Krach | Feb. 6, 1951 |
| 2,625,722 | West | Jan. 20, 1953 |
| 2,671,254 | Meyer | Mar. 9, 1954 |
| 2,695,434 | Bedford | Nov. 30, 1954 |